United States Patent
Bates et al.

(10) Patent No.: US 8,924,250 B2
(45) Date of Patent: Dec. 30, 2014

(54) ADVERTISING IN VIRTUAL ENVIRONMENTS BASED ON CROWD STATISTICS

(75) Inventors: Cary Lee Bates, Rochester, MN (US); Jim Chun-Ta Chen, Rochester, MN (US); Zachary Adam Garbow, Rochester, MN (US); Gregory Edward Young, South St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 2094 days.

(21) Appl. No.: 11/854,664

(22) Filed: Sep. 13, 2007

(65) Prior Publication Data
US 2009/0076894 A1    Mar. 19, 2009

(51) Int. Cl.
*G06Q 30/00* (2012.01)
*G06Q 30/02* (2012.01)

(52) U.S. Cl.
CPC ............ *G06Q 30/0264* (2013.01); *G06Q 30/02* (2013.01)
USPC ....................................................... 705/14.4

(58) Field of Classification Search
USPC ......................................................... 705/14
See application file for complete search history.

(56) References Cited

U.S. PATENT DOCUMENTS

| | | | |
|---|---|---|---|
| 6,931,254 B1 * | 8/2005 | Egner et al. ................ | 455/456.3 |
| 2003/0088463 A1 * | 5/2003 | Kanevsky et al. ............. | 705/14 |
| 2005/0216346 A1 * | 9/2005 | Kusumoto et al. ............. | 705/14 |
| 2005/0228719 A1 * | 10/2005 | Roberts et al. .................. | 705/14 |
| 2008/0004951 A1 * | 1/2008 | Huang et al. .................... | 705/14 |
| 2008/0201321 A1 * | 8/2008 | Fitzpatrick et al. .............. | 707/5 |
| 2008/0208685 A1 * | 8/2008 | Hamilton et al. .............. | 705/14 |
| 2008/0263459 A1 * | 10/2008 | Altberg et al. ................ | 715/757 |
| 2009/0030774 A1 * | 1/2009 | Rothschild et al. ............. | 705/10 |

OTHER PUBLICATIONS

Business: Virtual advertising. (Jan. 2000). The Economist, 354(8153), 68.*

* cited by examiner

*Primary Examiner* — Matthew T Sittner
(74) *Attorney, Agent, or Firm* — Patterson & Sheridan, LLP

(57) ABSTRACT

Embodiments of the invention may be used to place a targeted advertisement on a billboard (or other advertising location) in an immersive virtual environment by determining the interests of a group of users at a given location to calculate an advertisement matching the whole group. The selected advisement may be based not only on the sum of individual interests for the avatars present in the particular location, but also current interaction between the avatars. As groups of users communicate with one another within a virtual world, the substance of their communications may contribute to what advertisement is selected and presented to the avatars at the advertising location.

24 Claims, 5 Drawing Sheets

US 8,924,250 B2

ADVERTISING IN VIRTUAL ENVIRONMENTS BASED ON CROWD STATISTICS

BACKGROUND OF THE INVENTION

1. Field of the Invention

The field of the invention relates to virtual environment technologies, specifically to advertising in virtual environments based on crowd statistics.

2. Description of the Related Art

Currently, website operators frequently target ads toward individual users. For example, keywords entered into a search engine may be used to select an advertisement, or an advertisement may be selected based on personal information that a website collects while a users interact with that website.

However, in interactive three dimensional (3D) environments users are no longer isolated from one another. Individual users may gather in virtual locations and communicate with one another. For example, each individual user inside a virtual environment may be represented in the form of an avatar. An avatar is a graphical representation of a user within a virtual environment. Crowds of avatars may gather at a location within a virtual environment. Being able to view other avatars in a virtual location fosters social networking. For example, user A could click on user B's avatar to start an instant message conversation between user A and user B. Communications such as this could be useful for advertisers because communication about an advertisement increases the effectiveness of the advertisement.

SUMMARY OF THE INVENTION

Embodiments of the invention may be used to place a targeted advertisement on a billboard (or other advertising location) in an immersive virtual environment. One embodiment of the invention, a method of dynamically selecting an advertisement to present in an immersive virtual environment. The method generally includes identifying a plurality of avatars within a specified proximity of an advertising location within the immersive virtual environment. Each avatar provides a graphical representation for a user of the immersive virtual environment and the plurality of avatars are configured to interact with elements of the immersive virtual environment and with other avatars. The method also includes identifying a common interest of the plurality of avatars, selecting an advertisement to present at the advertising location, based on the common interest, and presenting the selected advertisement at the advertising location.

In a particular embodiment, the common interest may be identified based on the interaction of the plurality of avatars with the elements of the immersive virtual environment and with other avatars.

Another embodiment of the invention includes a computer-readable storage medium containing a program which, when executed, performs an operation for dynamically selecting an advertisement to present in an immersive virtual environment. The operation may generally include identifying a plurality of avatars within a specified proximity of an advertising location within the immersive virtual environment. Each avatar provides a graphical representation for a user of the immersive virtual environment and the plurality of avatars may be configured to interact with elements of the immersive virtual environment and with other avatars. The operation may also include identifying a common interest of the plurality of avatars, selecting an advertisement to present at the advertising location, based on the common interest, and presenting the selected advertisement at the advertising location.

Still another embodiment of the invention includes a system having a processor and a memory containing a program, which when executed on the processor, dynamically selects an advertisement to present in an immersive virtual environment. The program may generally be configured to identify a plurality of avatars within a specified proximity of an advertising location within the immersive virtual environment. Each avatar provides a graphical representation for a user of the immersive virtual environment and the plurality of avatars are configured to interact with elements of the immersive virtual environment and with other avatars. The program may be further configured to identify a common interest of the plurality of avatars, select an advertisement to present at the advertising location, based on the common interest, and present the selected advertisement at the advertising location.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
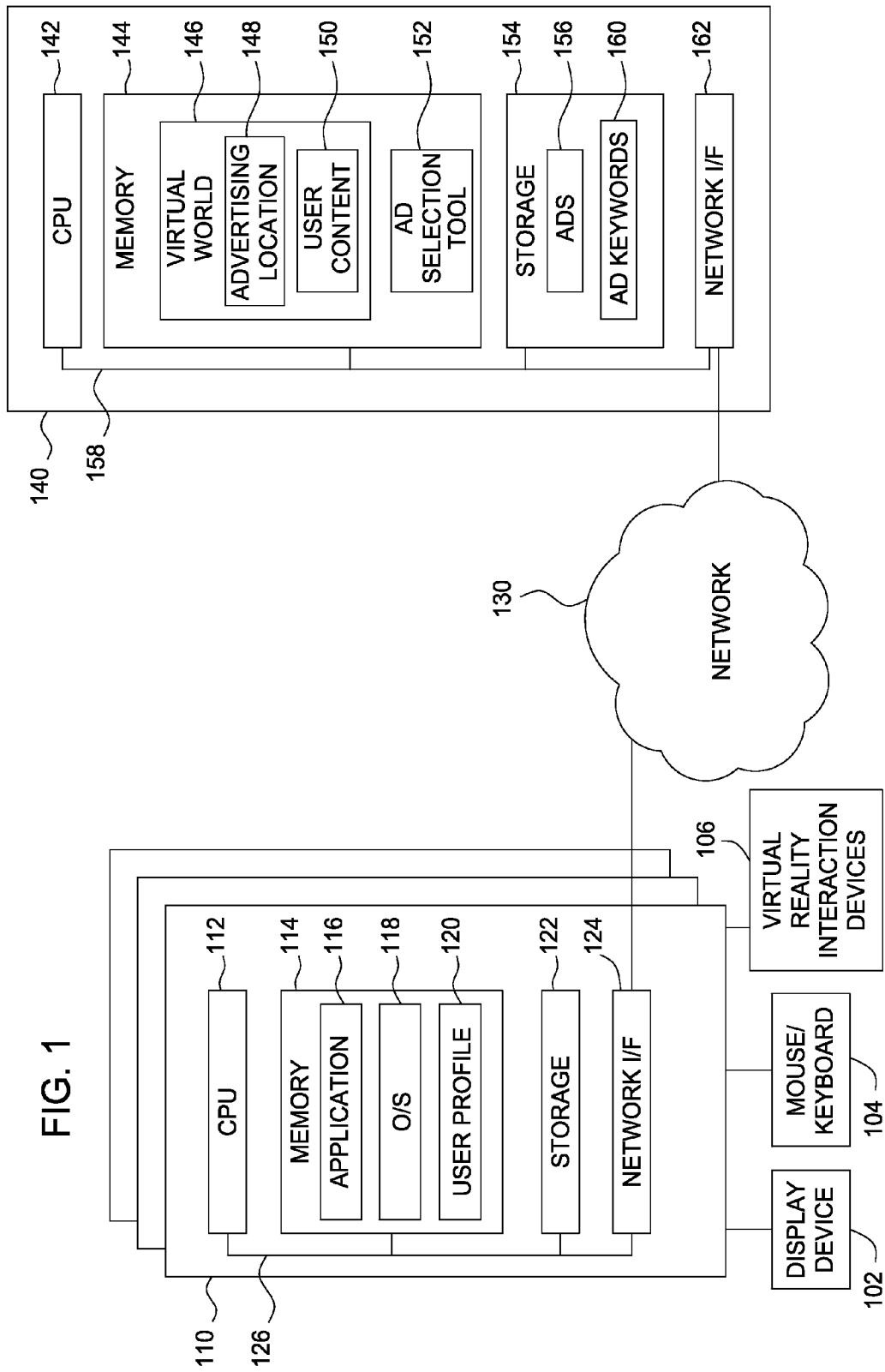
FIG. 1 illustrates a system for advertising in virtual environments based on crowd statistics, according to one embodiment of the invention.

The keyword-based and other advertising techniques used to tailor advertising over the environment do not translate well into a 3D environment. Targeting advertisements towards individual users in a 3D environment breaks the illusion of a shared space for all the users. For example, if avatars representing three users at a virtual park are staring at a virtual billboard, advertisements targeted to each of the individuals may differ because of the users' varied interests. Because each user's view of the billboard is unique, there is no common ground for communicating. Further, because users are less likely to discuss advertisements, advertisers do not reap the rewards of viral communications regarding the advertising.

Embodiments of the invention may be used to place a targeted advertisement on a billboard (or other advertising location) in an immersive virtual environment by determining the interests of a group of users at a given location to calculate an advertisement matching the whole group. The selected advisement may be based not only on the sum of individual interests for the avatars present in the particular location, but also current interaction between the avatars. That is, as groups of users communicate with one another within a virtual world, the substance of their communications may contribute to what advertisement is selected and displayed on the billboard. Further, as the same advertisement is presented to the group of avatars, members of the group may be more likely to initiate a discussion about the advertisement, hopefully, creating a group interest for that advertised product.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for advertising in virtual environments based on crowd statistics, according to one embodiment of the invention. As shown, system 100 includes client computers 110, a network 130, and a server computer 140. Client computer 110 and server computer 140 are intended to represent any type of computer, computer system or other programmable electronic device, including a portable computer, an embedded controller, a PC-based server, a minicomputer, a midrange computer, a mainframe computer, and other computers adapted to support embodiments of the invention. The network 130 could be any communications or computer network, or collection of networks capable of facilitating communications between the client 110 and the server 140. In one embodiment, the network 130 is the internet.

As shown, client 110 includes a central processing unit (CPU) 112, which obtains instructions and data via a bus 126 from a main memory 114 and storage 122. The processor 112 could be any processor used to perform an embodiment the invention. The main memory 114 is any memory sufficiently large to hold the necessary programs and data structures. The main memory 114 could be one or a combination of memory devices, including Random Access Memory, nonvolatile or backup memory, (e.g., programmable or flash memories, read-only memories, etc.). In addition, main memory 114 and storage 122 may include memory physically located elsewhere in a client 110, for example, on another computer coupled to the client 110. Finally, client 110 is connected to the network 130 by a network interface 124.

Main memory 114 includes an operating system 118. Operating system 118 is the software used for managing the operation of the client 110. Examples of operating systems 118 include UNIX, a version of the Microsoft Windows® operating system, and distributions of the Linux® operating system. (Note, Linux is at trademark of Linus Torvalds in the United States and other countries.)

Illustratively, main memory 114 also includes a client application 116 and a user profile 120. In one embodiment, client application 116 provides a software program that allows a user to connect to a virtual world 146, and once connected, to explore and interact with virtual world 146. Further, client application 116 may be configured to generate and display a visual representation of the user within the immersive environment, generally referred to as an avatar. The avatar of the user is generally visible to other users in the virtual world, and the user may view avatars representing the other users. The client application 116 may also be configured to generate and display the immersive environment to the user and to transmit the user's desired actions to a virtual world 146 on server 140. The client application 116 may also be configured to generate and present the user with a display of the virtual world. Such a display generally includes content from the virtual world determined from the avatar's line of sight at any given time. For the user, the display may include the avatar of that user or may be a camera eye where the user sees the virtual world through the eyes of the avatar representing this user.

The user may view the virtual world 146 using a display device 102, such as an LCD or CRT monitor display, and interact with the client application using a mouse and keyboard 104. Further, in one embodiment, the user may interact with client application 116 and virtual world 146 using a variety of virtual reality interaction devices 106. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 146.

User profile 120 may include personal information related to the user. For example, information such as hobbies, musical or clothing interests, and/or demographic information such as gender, family size, and income level. In one embodiment, personal information is stored in the user profile 120 as keywords. Thus, a user with an interest in mountain climbing might have the following keywords in the user profile 120: "mountain," "climb," "hike," "cliffs," and "trails."

Within virtual world 146, avatars can interact with other avatars, as well as with elements of the virtual world 146. For example, a user with avatar A could click on an avatar B to start an instant message conversation with the user associated with avatar B. In an example of avatar's interacting with elements of virtual world 146 environment, the user with avatar A could click on a building within the virtual world labeled as a library. In response, the client application 116 could cause the avatar representing user A to walk to the library, enter a lobby area and present the user with the interior of the library, including a virtual librarian, card catalog, and other library visitors "present" at that location within virtual world 146.

As shown, server 140 includes a central processing unit (CPU) 142, which obtains instructions and data via a bus 158 from a main memory 144 and storage 154. The processor 142 may be any processor used to perform the methods of the invention. The main memory 144 is any memory sufficiently large to hold the necessary programs and data structures. Main memory 144 could be one or a combination of memory devices, including Random Access Memory, nonvolatile or backup memory, (e.g., programmable or Flash memories, read-only memories, etc.). In addition, main memory 114 and storage 154 may be considered to include memory physically located elsewhere in a server 140, for example, on another computer coupled to the server 140 via bus 158. Server 140 is connected to the network 130 by a network interface 156.

Memory 144 includes virtual world 146 and an advertisement selection tool 152. As stated, virtual world 146 may be a software application that allows a user to explore and interact with elements provided by the immersive environment of virtual world 146. The virtual world 146 may define a virtual "space" representing, for example, a street, a room, a town, a building with multiple floors, a forest, or any other configuration of a virtual space. Illustratively, virtual environment 146 includes an advertising location 148 and user content 150. Examples of advertising location 148 include a virtual billboard within a virtual park, a billboard alongside a virtual highway, and an advertisement placed in a storefront window along a virtual "Main Street." In the last case, virtual world 146 could provide a virtual town "Main Street," and include a number of storefronts. In such a case, the buildings on the virtual "main Street" could include representations of a public library, a salon, a saloon, a shoe store, and a general store. Further, each storefront could have a sign and advertising displays 148 in a virtual window. Users could then navigate through this virtual world 146 by having their avatar traverse the virtual "Main Street," enter shops, and interact with other avatars. Of course, the position, appearance, and display characteristics of a given advertising location 148 may be tailored to suit any particular virtual world 146. Further, advertising location 148 may include both aural and visual components.

User content 150 represents information related to how users interact with one another within virtual world 146. In one embodiment, user content 150 such as the content of communications between users or interaction between a user and the virtual world 146 may be useful for targeting an advertisement to a crowd of avatars gathered at some common location proximal to one of advertising locations 148. An example of user content 150 is a conversation between two users. In such a case, the topic of the conversation, as gleaned by the words exchanged between the two users could contribute to determining which advertisement is selected by advertisement selection tool 152 for a given advertising location 148 (e.g., a virtual billboard).

While the term "billboard" may generally describe a real-world two-dimensional billboard, virtual world 146 may provide for a wide variety of advertising vehicles. In addition to a traditional billboard format, an advertiser could use virtual clouds, virtual U.F.O's, or even walking, talking avatars that serve as advertisements. Accordingly, the term billboard used herein is not intended to be limiting, but rather to represent any element within virtual world 146 through which an advertiser may communicate an advertisement. In one embodiment, the selected advertisement is presented to many avatars within the proximity of a given advertising location 148.

User content 150 may also include interactions performed by a given user (through their corresponding avatar) with the virtual environment 146. For example, a user clicking on a virtual mountain in order to climb it. Clicking on the virtual mountain could influence the advertisement selector 152 to select advertisements related to climbing equipment, especially where multiple avatars are present.

Storage 154 represents both volatile and non-volatile memory storage. In addition, storage 154 may include memory physically located elsewhere, for example, any storage capacity used as virtual memory or a mass storage device or on another computer coupled to the server 140 via bus 158 (e.g., an attached NFS server). Illustratively, storage 154 includes advertisements 156 and advertisement keywords 160. Advertisements 156 and advertisement keywords 156 may provide data structures configured contains a collection of advertisements, and a set of keywords associated with a given advertisement. Advertisements 156 may take the form of images, text, video, or combinations of images, text, and/or video.

Advertisement keywords 160 may include sets of keywords for matching users to user content 150. Each advertisement in advertisement 156 may be associated with a particular set of keywords from advertisement keywords 160. In one embodiment, advertisement selector 152 selects an advertisement from advertisement 156 by comparing the advertisement keywords 160 for each advertisement 156 to the user profiles 120 and user content 150. The advertisement selector 152 selects an advertisement from advertisement 156 for a virtual advertising location 146 (e.g., a virtual billboard or other signage) based on which advertisement 156 may have keywords 160 that favorably match with the user profiles 120 and user content 150 for a group of avatars users within the proximity of the virtual billboard 148.

Advantageously, by tailoring an advertisement to a significant portion of the viewing population as opposed to targeting advertisements to individual users, an advertisement that appeals to a common interest among a crowd of avatars in a virtual environment may encourages communication about a product advertised in a given advertisement. Accordingly, advertisers reap the benefits of communications about the advertisement, in terms of an advertisement's increased effectiveness. For example, as avatars come within the proximity of a virtual billboard board, advertisement selector 152 may evaluate user profiles 120 and user content 150 associated with each avatar in a crowd. In addition to commonalities among the user profiles 120 and user content 150, other factors may influence the selection of an advertisement. In some embodiments, certain users could exert greater influence than other users on the commonality of an interest, based on user content 150. For example, a user with a keyword, 'cars' in a user profile 120 that is currently discussing cars with another user would increase the likelihood that the advertisement selector 152 selects an advertisement related to cars, than if the user merely had the keyword, 'cars,' in the user profile 120, and is not discussing anything.

Figure 2A:
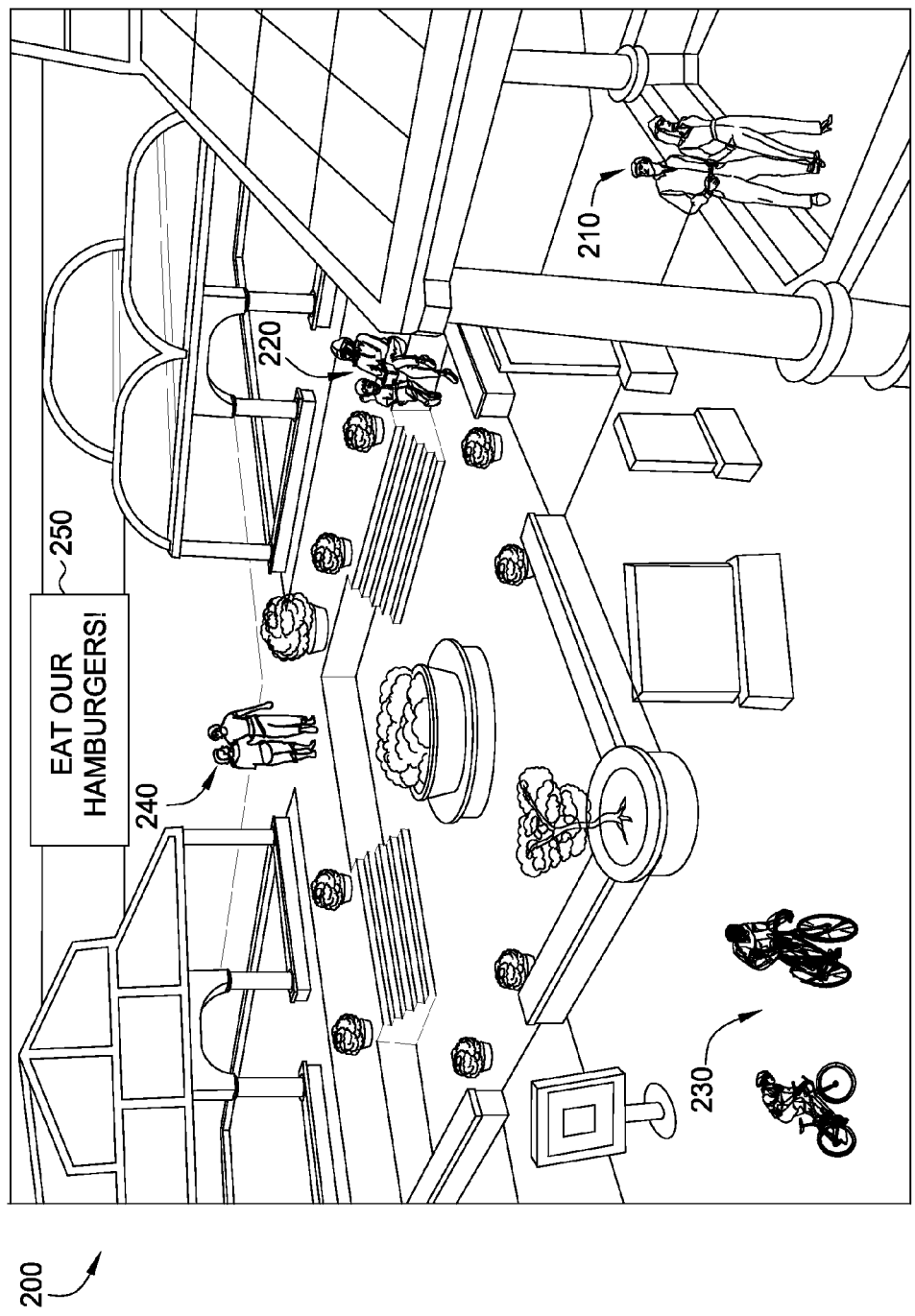
FIG. 2A is an example screen display from an immersive virtual environment, according to one embodiment of the invention.
Figure 2B:
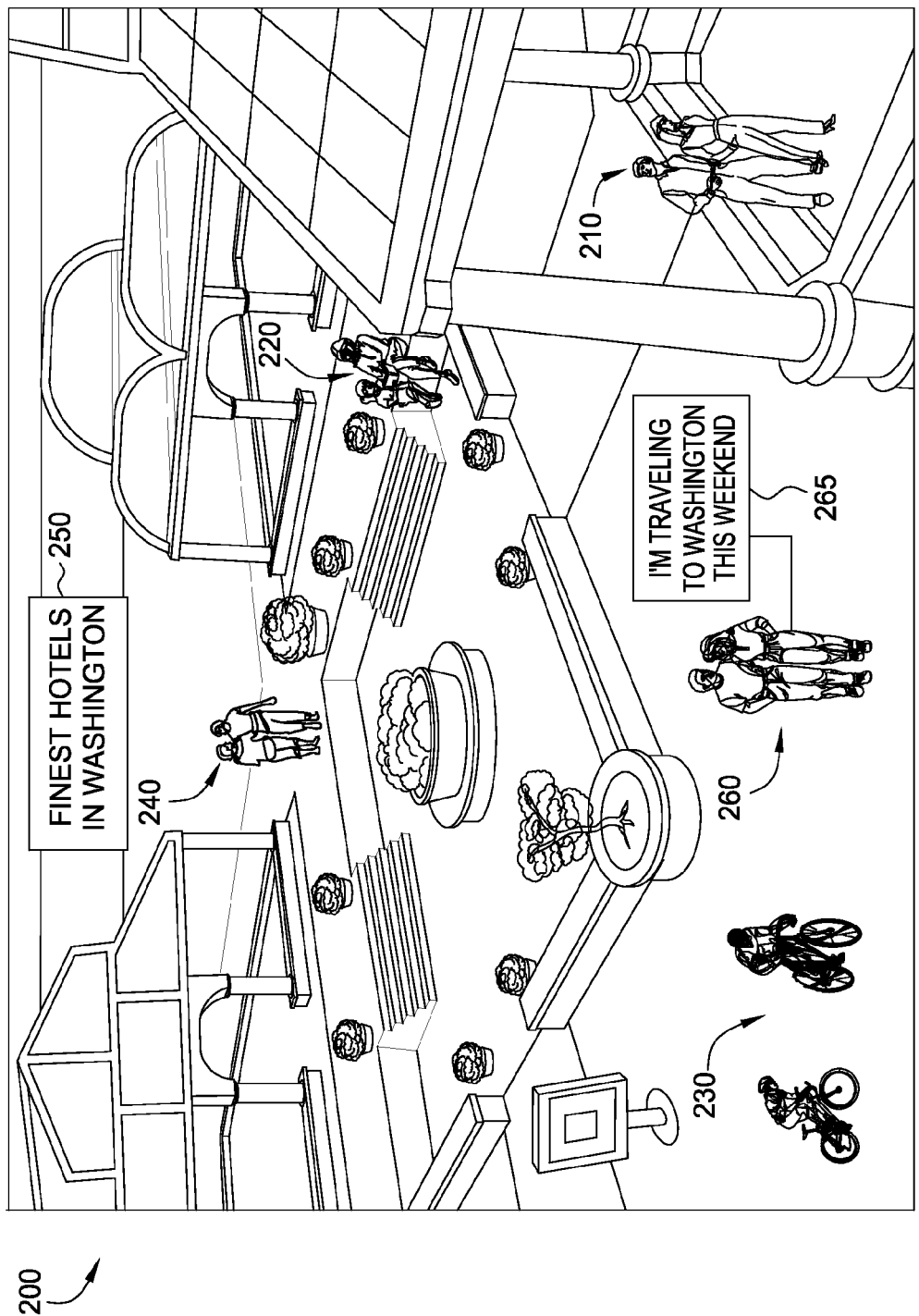
FIG. 2B is an example screen display from an immersive virtual environment, according to one embodiment of the invention.
Figure 2C:
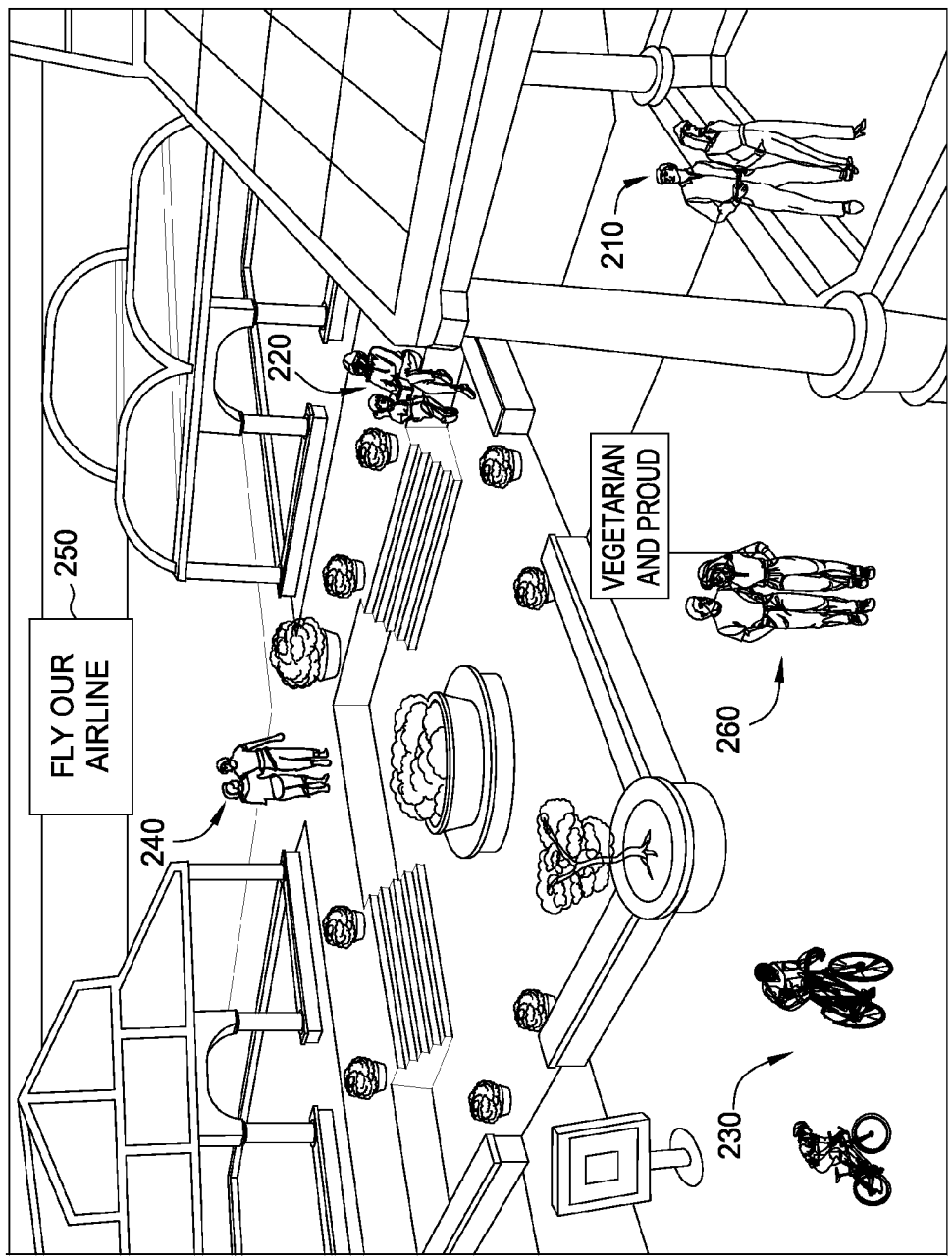
FIG. 2C is an example screen display from an immersive virtual environment, according to one embodiment of the invention.

FIGS. 2A-2C illustrate examples scenarios advertising selection in virtual environments, based on crowd statistics. FIG. 2A is an example screen display 200 from an immersive virtual environment, according to one embodiment of the invention. As shown, screen shot 200 depicts a park scene with a billboard 250. The scene includes assorted avatars 210 (flying), 220 (sitting on a bench), 230 (riding bikes), and 240 (walking). Illustratively, billboard 250 displays an advertisement for a fast-food business. The advertisement selector 152 may have selected this advertisement based on keywords associated with the hamburger advertisement and the user profiles 120 of the avatars 210, 220, 230, and 240.

As stated, user profiles 120 may contain demographic information used to contribute to which advertisement the advertisement selector 152 displays in a virtual world 146 in a given case. For example, an operator of the fast-food business shown in advertisement 250 may prefer an audience with a disposable income. Accordingly, the advertisement selector 152 could analyze user profiles 120 for information about income levels when determining whether to select this particular advertisement to display on the virtual billboard 250 to the avatars 210, 220, 230, and 240.

Also as stated, user content 150 may influence the content selected by advertisement selector 152 to display on the virtual billboard 250. FIG. 2B is another example screen display from an immersive virtual environment, according to one embodiment of the invention. Specifically, FIG. 2B illustrates an example of user content 150 where an avatar 260 is communicating with another avatar 265. A text-balloon 275 illustrates the message, "I'm traveling to Washington this weekend." In one embodiment, this message may be communicated as part of an instant message communication between avatar 260 and 265. In such a case, the advertisement selector 152 may evaluate the text of the conversation, including the keywords "Washington" and "travel" when determining an advertisement from advertisements 156. As shown, advertisement selector 152 has chosen an advertisement for a Washington hotel to display on the virtual billboard 250.

FIG. 2C is another example screen display from an immersive virtual environment, according to one embodiment of the invention. Specifically, FIG. 2C illustrates an example screen display from a virtual world where both advertisers and users may define rules about placing of advertisements 156. For example, a vegetarian user may specify in their user profile 120 that this user prefers not to see advertisements for meat products while within the virtual environment. As is shown in FIG. 2C, the vegetarian user's preference may supersede the selection of an advertisement for the fast-food business, and in this case an alternate advertisement for an airline is displayed on the virtual billboard 250.

Similarly, an advertiser may specify conditions where a particular advertisement 156 is not displayed. For example, the operator of the fast-food business may specify that the advertisement should not be displayed when a crowd is more than ten percent vegetarian (as specified in user profiles 120) of a group of avatars congregating near advertising location 148 (i.e., billboard 250). In such a case, an alternate advertisement, such as the airline advertisement shown in FIG. 2B, is displayed despite the fact that the advertisement selector 152 determines that the hamburger advertisement addresses the most common interests of the crowd.

In some embodiments, the advertisement selector 152 may also consider the avatar's position relative to an advertising location 148. Specifically, the lesser the ability of a user to view an advertisement clearly, the lesser the influence of that user's profile 120 in determining the advertisement selected. In other words, avatars at a close distance with a direct view of the advertisement have a greater influence on the selection of the advertisement than avatars at a greater distance, or in a position where the viewing angle makes the advertisement difficult to view. For example, avatars 240 would have a greater influence on the advertisement selected than avatars 260 and 230 because of the differences in distance and viewing angles.

Figure 3:
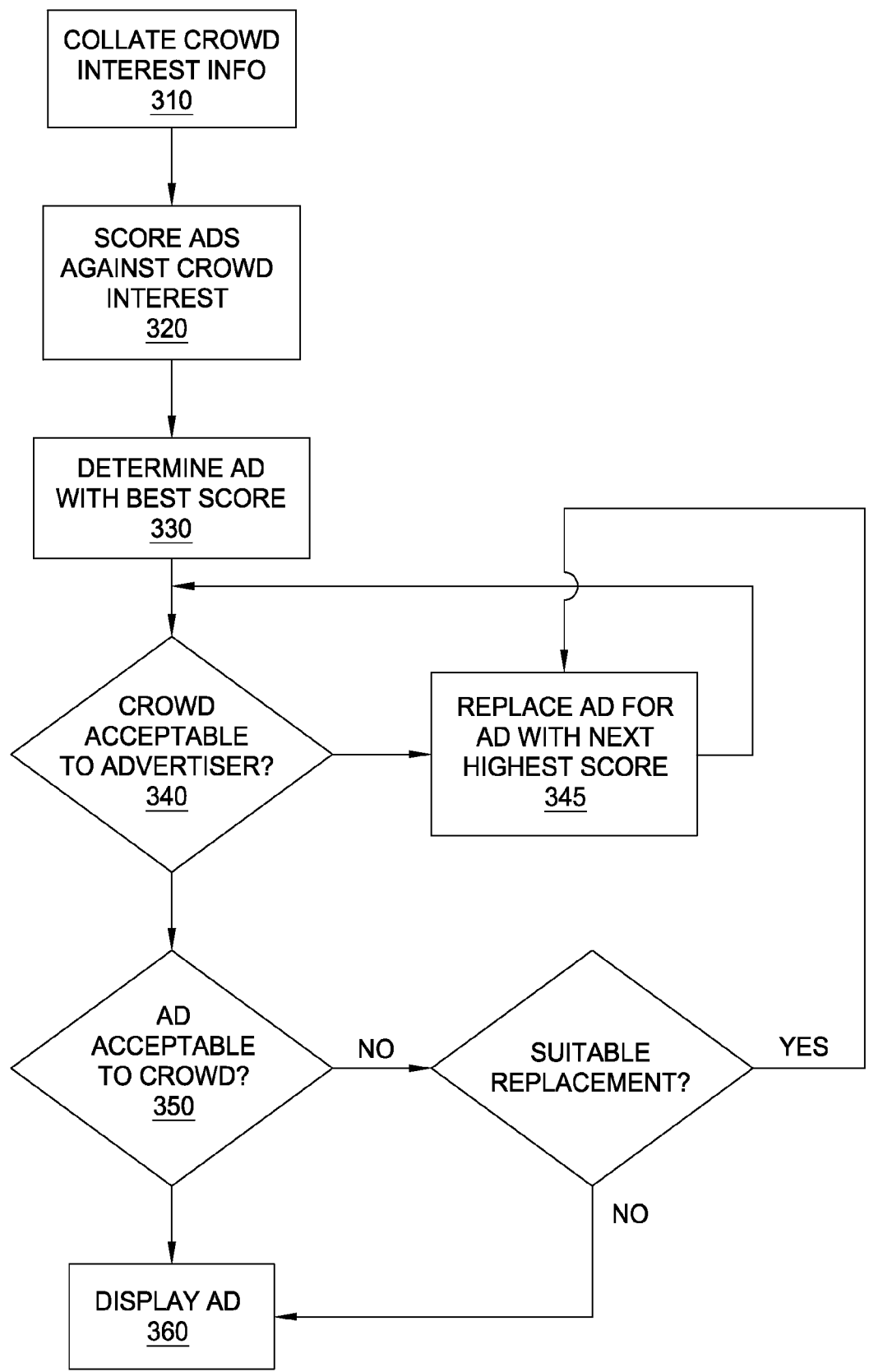
FIG. 3 is a flowchart illustrating a process for advertising in virtual environments based on crowd statistics, according to one embodiment of the invention.

FIG. 3 is a flowchart illustrating a process 300 for advertising in virtual environments based on crowd statistics, according to one embodiment of the invention. As shown, the process 300 begins at step 310, where the advertisement selector 152 reads the user profile 120 (i.e., specified user information and demographic data) and user content 150 (i.e., communications between avatars and/or avatar interactions with the virtual world) associated with each avatar in a crowd proximate to an advertising location within a virtual world. In one embodiment, the advertisement selector 152 may evaluate this information to identify common interests among avatars in the crowd and/or to identify the substance of communication between members of the group of avatars (e.g., by dynamically parsing the text of instant message conversations).

At step 320, the advertisement selector 152 scores the advertisements 156 against the aggregated crowd interest and demographic information evaluated at step 310. In one embodiment, the advertisements 156 may be assigned points for each keyword associated with a given advertisement also found in the aggregated crowd interest. Further, when multiple users are associated with a keyword, then an advertisement may receive more points proportionate. At step 330, once the advertisements 156 are evaluated, the advertisement selector 152 may determines which advertisement was assigned the highest score.

In addition to seeking common interests among users, at step 340, the advertisement selector 152 determines if the crowd is acceptable to the advertiser sponsoring the advertisement selected at step 300. For example, consider the advertisement sponsored by a fast-food business from FIG. 2A, the operator of the fast-food business may specify that the restaurant's advertisement should not be displayed to crowds of avatars having demographic (or user content such as instant message characteristics) indicating that a sizeable percentage of the users corresponding to the avatars in the crowd are vegetarian. If the crowd is not acceptable to the advertiser, then at step 345, the advertisement selector 152 chooses the next highest scoring advertisement, and the process 300 returns to step 340.

Otherwise, at step 350, the advertisement selector 152 may determines whether the selected advertisement is acceptable to the crowd of avatars. That is in one embodiment, similar to the user advertiser preferences discussed in conjunction with step 340 and 345; individual users may also specify whether they wish to view certain types of advertisements while within the immersive virtual world. If the advertisement is sufficiently acceptable for the avatars in the crowd, at step 360, the advertising selector 152 displays the advertisement within the (e.g., the advertisement is rendered on a virtual billboard, as shown in FIGS. 2A-2C).

If the advertisement is not acceptable to the crowd, at step 355, the advertisement selector 152 determines whether the advertisement with the next highest score is a suitable replacement. In one embodiment, the advertisement selector 152 may determines whether a potential replacement advertisement is suitable based on the difference between the scores of the highest scored advertisement and the potential replacement advertisement. If the difference is significant, the advertisement selector determines that the replacement advertisement is not suitable, and at step 360, the advertisement selector 152 displays the highest scored advertisement. What point differential, or percentage differential between highest scored advertisement and potential replacement advertisement is deemed significant may be tailored to suit the needs in a partial case.

For example, in some embodiments, a potential replacement advertisement may be a suitable replacement if the score of the potential replacement advertisement is within ten percent of the higher scoring advertisement. Suppose for example, at step 320, a hamburger advertisement, and an advertisement for a vegetarian burger product receive scores of 200 and 180, respectively for a particular crowd of avatars. In such a case, at step 330, the advertisement selector may determine that the hamburger advertisement receives the highest score. Thus, at step 340 at least, the crowd of avatars is acceptable to the hamburger advertiser.

However, at step 350, assume that the advertisement selector 152 determines that a vegetarian user in the crowd does not wish to see advertisement for meat products. At step 355, the advertisement selector may compare the hamburger advertisement score to the score of the next highest-scored advertisement, the veggie burger advertisement. Because the score for the vegetation burger advertisement is within ten percent of the score for the conventional hamburger advertisement, the advertisement selector 152 may determine that the veggie burger advertisement is a suitable replacement.

To illustrate another example, assume that vegetarian burger advertisement is the next highest-scored advertisement, but the score is 50 instead of 180. In such a case, the advertisement selector 152 may determine that the veggie burger advertisement is not a suitable replacement because the score of the conventional hamburger advertisement score far exceeds a ten percent differential. Accordingly, in such a case, the advertisement selector 152 selects and displays the hamburger advertisement.

In one embodiment, step 355 is optional, making the process more user friendly. In other words, if an advertisement is unsuitable to a user in the crowd, there is no test for a suitable replacement advertisement. Instead, the advertisement with the next highest score is selected and the process repeats from step 340 regardless of whether a suitable replacement is available. Of course, in such an embodiment, the advertisement selector may make some exceptions for cases when the composition of the crowd dictates that no advertisement could be displayed in line with all the users' preferences.

Advantageously, embodiments of the invention may be used to place a targeted advertisement on a billboard (or other advertising location) in an immersive virtual environment based on the common interests of a group of avatars around the billboard. The selected advisement may be based not only on the sum of individual interests for the users present in the particular location, but also current interaction between the avatars. That is, as groups of users communicate with one another within a virtual world, the substance of their communications may contribute to what advertisement is selected and displayed on the billboard. Accordingly, in one embodiment, advertiser preferences regarding user demographics, stated user profiles, user interactions within a given virtual world, both in communicating with one another and with the environment itself may contribute to whether a given advertisement is selected. As the same advertisement is presented to the group of avatars, members of the group may be more likely to initiate a discussion about the advertisement, hopefully, creating a group interest for that advertised product.

While the foregoing is directed to embodiments of the present invention, other and further embodiments of the invention may be devised without departing from the basic scope thereof, and the scope thereof is determined by the claims that follow.

What is claimed is:

1. A computer implemented method of dynamically selecting an advertisement to present in an immersive virtual environment, wherein steps of the computer implemented method are performed by a microprocessor, the computer implemented method comprising:

identifying a plurality of avatars within a specified proximity of an advertising location within the immersive virtual environment, wherein each avatar provides a graphical representation for a user in the immersive virtual environment, and wherein the plurality of avatars are configured to interact with elements of the immersive virtual environment and with other avatars;

identifying a common interest of the plurality of avatars;

selecting an advertisement to present at the advertising location, based on the common interest; and presenting the selected advertisement at the advertising location.

2. The computer implemented method of claim 1, wherein the common interest is identified based on the interaction of the plurality of avatars with the elements of the immersive virtual environment and with other avatars.

3. The computer implemented method of claim 2, wherein the interaction of the plurality of avatars with other avatars comprises an instant message conversation between at least a first avatar and a second avatar, and wherein identifying a common interest of the plurality of avatars comprises evaluating keywords of the instant message conversation.

4. The computer implemented method of claim 1, wherein the common interest is identified based on a user profile associated with each of the plurality of avatars.

5. The computer implemented method of claim 4, wherein the common interest is further identified by prioritizing the influence of the user profile based on visibility of the advertisement.

6. The computer implemented method of claim 1, wherein the advertisement includes components selected from an image component, a video component and an audio component.

7. The computer implemented method of claim 1, further comprising:

receiving a plurality of user rules, wherein each of the plurality of user rules specifies an advertisement type that is not acceptable to one of the plurality of avatars; and determining whether the selected advertisement is acceptable to the plurality of avatars, based on a plurality of advertisement types associated with the selected advertisement and the plurality of user rules;

if the selected advertisement is not acceptable to the plurality of avatars:
  selecting a replacement advertisement from the plurality of advertisements; and
  presenting the replacement advertisement at the advertising location.

8. The computer implemented method of claim 1, further comprising:
  receiving an advertiser rule, wherein the advertiser rule specifies one or more user types that are not acceptable to an advertiser associated with the selected advertisement; and
  determining whether the plurality of avatars is acceptable to the advertiser associated with the selected advertisement, based on a plurality of user types associated with the plurality of avatars, and the advertiser rule;
  if the selected advertisement is not acceptable to the advertiser:
    selecting a replacement advertisement from the plurality of advertisements; and
    presenting the replacement advertisement at the advertising location.

9. A computer-readable storage medium containing a program which, when executed, performs an operation for dynamically selecting an advertisement to present in an immersive virtual environment, the operation comprising:
  identifying a plurality of avatars within a specified proximity of an advertising location within the immersive virtual environment, wherein each avatar provides a graphical representation for a user in the immersive virtual environment, and wherein the plurality of avatars are configured to interact with elements of the immersive virtual environment and with other avatars;
  identifying a common interest of the plurality of avatars;
  selecting an advertisement to present at the advertising location, based on the common interest; and
  presenting the selected advertisement at the advertising location.

10. The computer-readable storage medium of claim 9, wherein the common interest is identified based on the interaction of the plurality of avatars with the elements of the immersive virtual environment and with other avatars.

11. The computer-readable storage medium of claim 10, wherein the interaction of the plurality of avatars with other avatars comprises an instant message conversation between at least a first avatar and a second avatar, and wherein identifying a common interest of the plurality of avatars comprises evaluating keywords of the instant message conversation.

12. The computer-readable storage medium of claim 9, wherein the common interest is identified based on a user profile associated with each of the plurality of avatars.

13. The computer-readable storage medium of claim 12, wherein the common interest is further identified by prioritizing the influence of the user profile based on visibility of the advertisement.

14. The computer-readable storage medium of claim 9, wherein the advertisement includes components selected from an image component, a video component and an audio component.

15. The computer-readable storage medium of claim 9, wherein the operations further comprise:
  receiving a plurality of user rules, wherein each of the plurality of user rules specifies an advertisement type that is not acceptable to one of the plurality of avatars; and
  determining whether the selected advertisement is acceptable to the plurality of avatars, based on a plurality of advertisement types associated with the selected advertisement and the plurality of user rules;
  if the selected advertisement is not acceptable to the plurality of avatars:
    selecting a replacement advertisement from the plurality of advertisements; and
    presenting the replacement advertisement at the advertising location.

16. The computer-readable storage medium of claim 9, wherein the operations further comprise:
  receiving an advertiser rule, wherein the advertiser rule specifies one or more user types that are not acceptable to an advertiser associated with the selected advertisement; and
  determining whether the plurality of avatars is acceptable to the advertiser associated with the selected advertisement, based on a plurality of user types associated with the plurality of avatars, and the advertiser rule;
  if the selected advertisement is not acceptable to the advertiser:
    selecting a replacement advertisement from the plurality of advertisements; and
  presenting the replacement advertisement at the advertising location.

17. A system, comprising:
a processor; and
a memory containing a program, which when executed on the processor, dynamically selects an advertisement to present in an immersive virtual environment by performing the steps of:
  identifying a plurality of avatars within a specified proximity of an advertising location within the immersive virtual environment, wherein each avatar provides a graphical representation for a user in the immersive virtual environment, and wherein the plurality of avatars are configured to interact with elements of the immersive virtual environment and with other avatars;
  identifying a common interest of the plurality of avatars;
  selecting an advertisement to present at the advertising location, based on the common interest; and
  presenting the selected advertisement at the advertising location.

18. The system of claim 17, wherein the common interest is identified based on the interaction of the plurality of avatars with the elements of the immersive virtual environment and with other avatars.

19. The system of claim 18, wherein the interaction of the plurality of avatars with other avatars comprises an instant message conversation between at least a first avatar and a second avatar, and wherein identifying a common interest of the plurality of avatars comprises evaluating keywords of the instant message conversation.

20. The system of claim 17, wherein the common interest is identified based on a user profile associated with each of the plurality of avatars.

21. The system of claim 20, wherein the common interest is further identified by prioritizing the influence of the user profile based on visibility of the advertisement.

22. The system of claim 17, wherein the advertisement includes components selected from an image component, a video component and an audio component.

23. The system of claim 17, wherein the steps further comprise:
- receiving a plurality of user rules, wherein each of the plurality of user rules specifies an advertisement type that is not acceptable to one of the plurality of avatars; and
- determining whether the selected advertisement is acceptable to the plurality of avatars, based on a plurality of advertisement types associated with the selected advertisement and the plurality of user rules;
- if the selected advertisement is not acceptable to the plurality of avatars:
  - selecting a replacement advertisement from the plurality of advertisements; and
  - presenting the replacement advertisement at the advertising location.

24. The system of claim 17, wherein the steps further comprise:
- receiving an advertiser rule, wherein the advertiser rule specifies one or more user types that are not acceptable to an advertiser associated with the selected advertisement; and
- determining whether the plurality of avatars is acceptable to the advertiser associated with the selected advertisement, based on a plurality of user types associated with the plurality of avatars, and the advertiser rule;
- if the selected advertisement is not acceptable to the advertiser:
  - selecting a replacement advertisement from the plurality of advertisements; and
  - presenting the replacement advertisement at the advertising location.

* * * * *